J. D. BROWN.
Broom-Corn Seeder.
No. 68,346.
Patented Sept. 3, 1867.
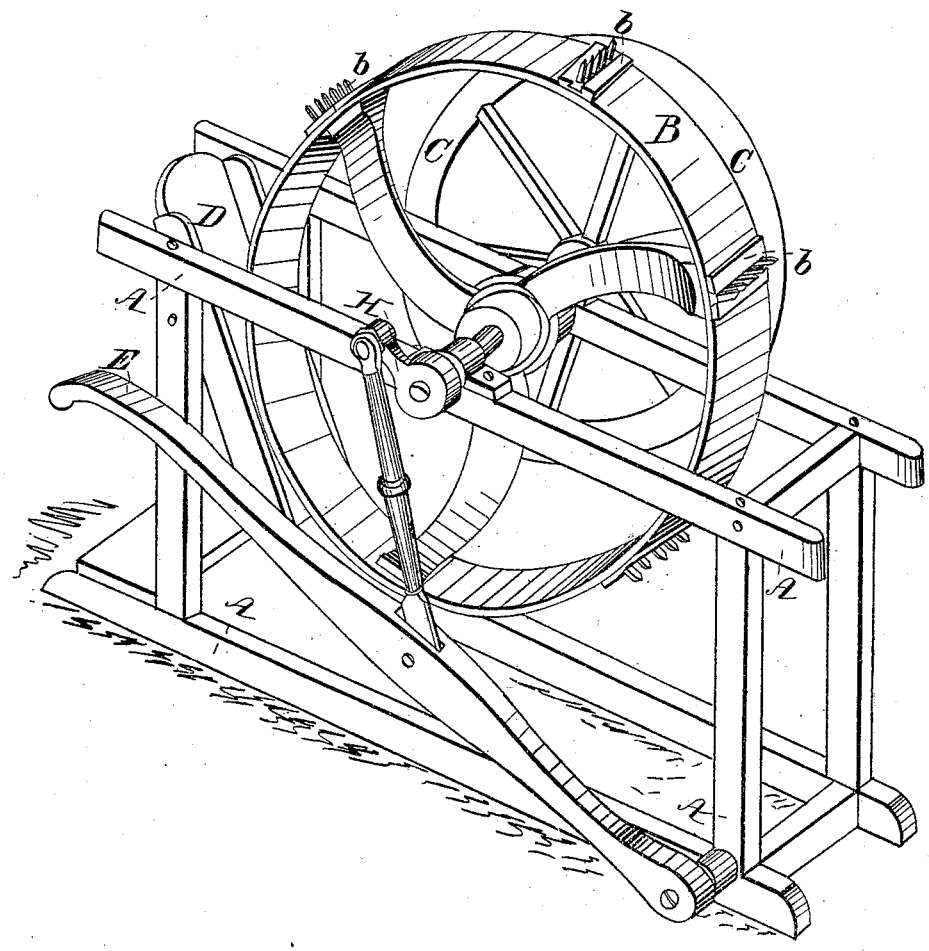
Witnesses:
Wm B Webster
J E Williams
Inventor,
James D Brown
By Joseph Ridge
his attorney

United States Patent Office.

JAMES D. BROWN, OF PREBLE COUNTY, OHIO

Letters Patent No. 68,346, dated September 3, 1867.

---

IMPROVEMENT IN MACHINE FOR REMOVING THE SEED FROM BROOM-CORN.

---

The Schedule referred to in these Letters Patent and making part of the same.

---

TO ALL WHOM IT MAY CONCERN:

Be it known that I, JAMES D. BROWN, of the county of Preble, and State of Ohio, have invented a new and useful Machine for Seeding Broom-Corn; and I do hereby declare that the following is a full, clear, and exact description of the same, reference being had to the accompanying drawings, which form a part of this specification.

To enable others skilled in the art to make and use my invention, I will proceed to describe its construction and operation.

A represents the frame or support. B represents a wheel provided with teeth (as shown at $b\ b$.) C represents the fly-wheel. The manner of imparting motion to wheel B is apparent from the drawings, as shown by treadle E and crank H.

The manner of operating is as follows: The broom-corn is inserted, head down, in the chute D, while by means of treadle E the wheel B is made to rotate rapidly in the direction of said chute until the seed is thus completely threshed out, when the stalks of said corn are withdrawn. For convenience a table is situated at the left of the operator, upon which the broom-corn is laid preparatory to the operation of seeding.

Having thus fully described my said invention, what I claim, and desire to secure by Letters Patent, is—

I claim the wheel B, provided with teeth or spikes $b\ b$, and the chute D, arranged and in combination with the whole, substantially as herein set forth, and for the purpose specified.

JAMES D. BROWN.

Witnesses:
SAML. F. ESTELL,
R. ESTELL.